United States Patent [19]

Gaudin

[11] Patent Number: 5,591,284

[45] Date of Patent: Jan. 7, 1997

[54] RADIAL TIRE WITH TRIANGULATED STEEL CORD BELT

[75] Inventor: Yves Gaudin, Maillet, France

[73] Assignee: Dunlop France SA, Paris, France

[21] Appl. No.: 429,565

[22] Filed: Apr. 27, 1995

[30] Foreign Application Priority Data

Apr. 28, 1994 [FR] France ................... 94 05148

[51] Int. Cl.$^6$ ................ B60C 9/00; B60C 9/18; B60C 9/20

[52] U.S. Cl. ................ 152/532; 152/526; 152/534; 152/538

[58] Field of Search ................ 152/526, 532, 152/534, 538

[56] References Cited

U.S. PATENT DOCUMENTS

| | | | |
|---|---|---|---|
| 3,131,744 | 5/1964 | Boussu et al. | 152/534 |
| 5,154,217 | 10/1992 | Kanamaru | 152/532 X |
| 5,427,164 | 6/1995 | Williams et al. | 152/532 X |

FOREIGN PATENT DOCUMENTS

| | | |
|---|---|---|
| 0280674 | 8/1988 | European Pat. Off. . |
| 0593215 | 4/1994 | European Pat. Off. . |
| 2358998 | 2/1978 | France . |
| 1248439 | 10/1971 | United Kingdom . |
| 1479011 | 7/1977 | United Kingdom . |
| 1483053 | 8/1977 | United Kingdom . |

OTHER PUBLICATIONS

Patent Abstracts of Japan, vol. 11, No. 360 (M-645) 25 Nov. 1987 (Bridgestone Corp) & JP-A-62 137203, 20 Jun. 1987.

*Primary Examiner*—Adrienne C. Johnstone
*Attorney, Agent, or Firm*—Birch, Stewart, Kolasch & Birch, LLP.

[57] ABSTRACT

A heavy duty radial tire including a tread region reinforced by a breaker strip assembly comprising at least three breaker plies of fabric of parallel metallic cords in which the cords of the radially innermost first ply and those of the third ply are inclined at a relatively small angle with respect to the equatorial plane of the tire, wherein the cords of the second ply, disposed radially between the first and third plies, are the only cords inclined at an inclination angle with respect to the equatorial plane in the range of 40° to 85°, and wherein the cords of the first and third plies are inclined in opposite directions to each other and have inclination angles with respect to the equatorial plane in the range of 5° to 40°.

14 Claims, 3 Drawing Sheets

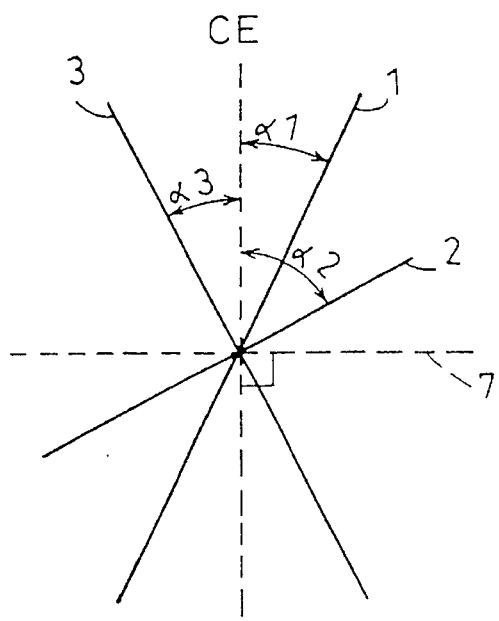
FIG_2
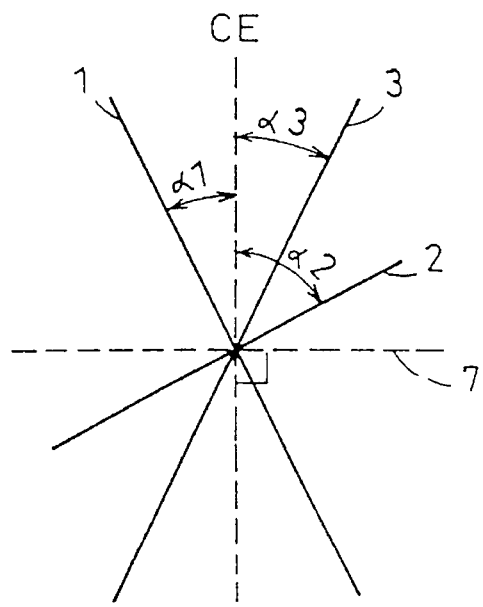
FIG_3
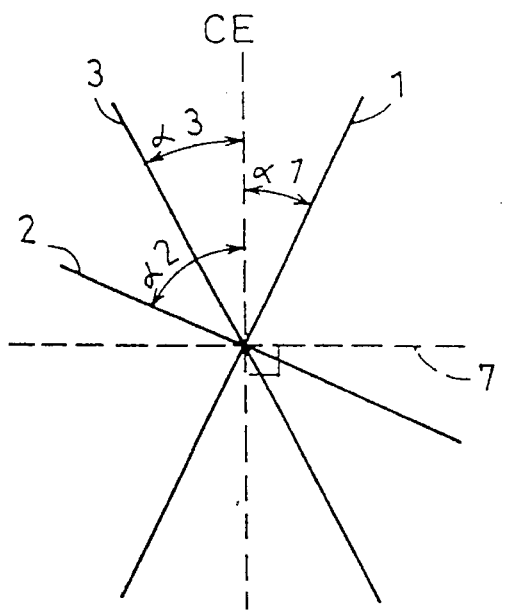
FIG_4
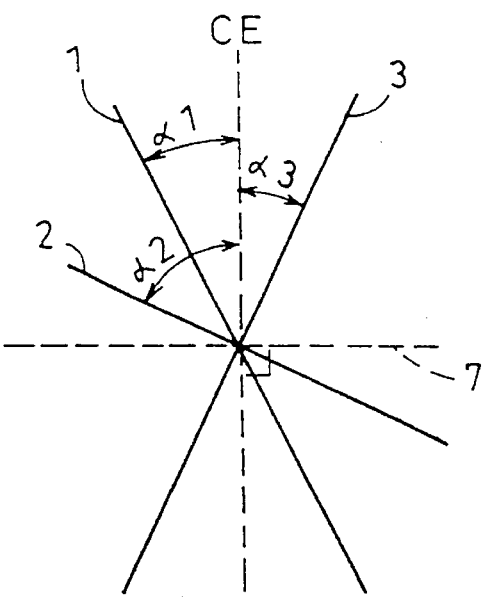
FIG_5

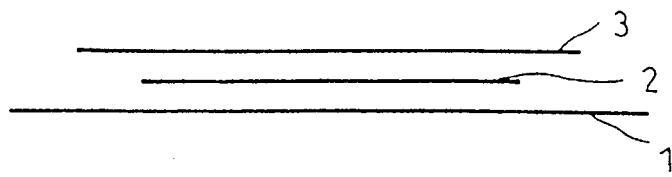
FIG_6
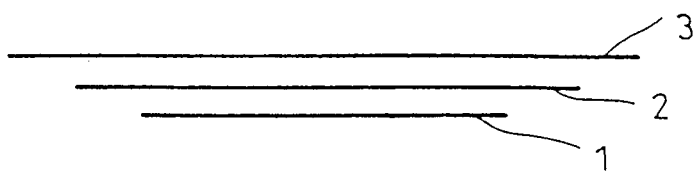
FIG_7
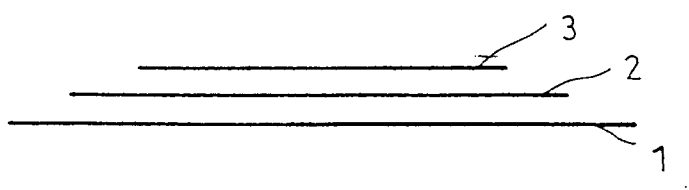
FIG_8
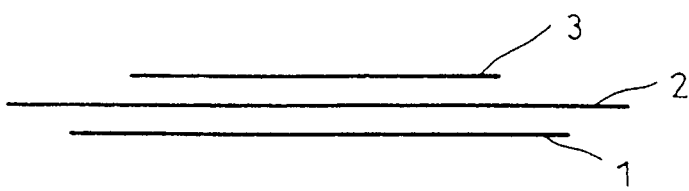
FIG_9
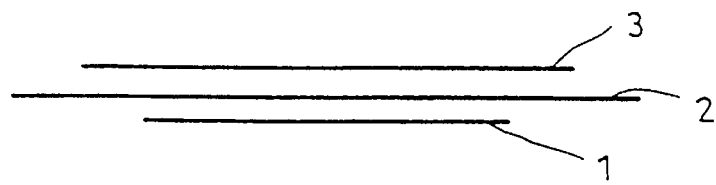
FIG_10
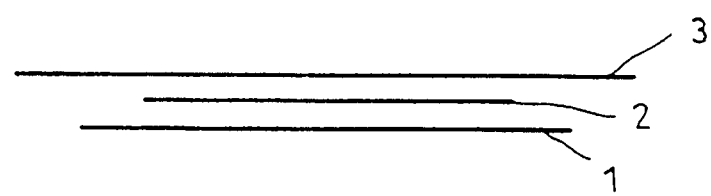
FIG_11
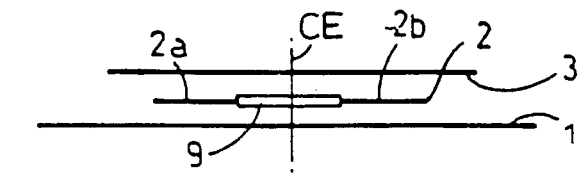
FIG_12

RADIAL TIRE WITH TRIANGULATED STEEL CORD BELT

The present invention relates to radial tires and in particular but not exclusively to heavy duty tires for vehicles such as trucks or buses.

BACKGROUND OF THE INVENTION

Such heavy duty tires have relatively flat ground contacting tread regions reinforced by a breaker strip assembly or belt which is dedicated to maintaining a consistent contact between the tire and road surface under all conditions. Such reinforcing breaker strip assemblies normally comprise three or more plies of fabric each consisting of rubber coated metallic cords laid parallel to each other and inclined with respect to the equatorial plane of the tire. Often a narrower fourth ply sometimes termed a "slave" ply is arranged radially outside the three main belt plies. This fourth ply has the function of protecting the main breaker strip assembly both in service and particularly in subsequent retreading operations.

In a conventional arrangement the cords of the radially innermost first ply are inclined at a relatively large angle with respect to the equatorial plane of the tire while the cords of the adjacent second and third plies are inclined at relatively small angles with respect to the tire equatorial plane and in opposite directions to each other. Accordingly crossing angles of the cords of the radially innermost three plies form a triangulated structure which, together with the stiffness of the cords themselves, provides an effective breaker belt of high rigidity in the longitudinal and axial directions of the belt, thus keeping the tire tread flat on the road surface.

Furthermore in belt design, it is desirable to stagger the ply endings in the edge regions of the belt by employing plies of differing widths. This gives a progressive reduction in stiffness and minimized stress concentration at the belt edge. Accordingly, the conventional design for truck tire belts is for the widest ply to be the inner of the two low angles plies and the innermost high angle ply and the other low angle ply to be of similar widths. The belt may optionally include a radially outermost and narrowest fourth ply of low angle cords.

Conventionally, the metallic cords of the belt plies used in heavy duty tires comprise steel wires which are surface coated with brass to promote adhesion to their rubber coating. In the cutting of the belt plies from the fabric sheet, the metallic cords are cut at an acute angle to the cord direction resulting in cut faces which are both sharp and devoid of brass coating. Despite the stress level of the belt edges being minimized the factors of sharp cut ends, poor adhesion and the concentration of stress at the cut face combine to promote the breakdown of adhesion and cutting of the rubber at the belt edge. This so called "belt ply looseness" is a common cause of premature tire failure.

Previous attempts to solve the problem of edging rubber looseness include, for example, the disclosure of document FR-A-2358998 which describes a belt for truck tires comprising a narrow high angle ply sandwiched between an inner wide low angle ply and an outer wide low angle ply. However, the two low angle plies have cords lying in the same direction so that, in combination with the oppositely inclined high angle cords, they do not form a triangulated structure. Accordingly such a non-triangulated belt is not very effective in reinforcing the tire tread region.

SUMMARY OF THE INVENTION

It is therefore an object of the present invention to provide a triangulated belt for a heavy duty tire which is improved in belt ply looseness.

According to the present invention a heavy duty radial tire includes a ground contacting tread region reinforced by a breaker strip assembly comprising at least three breaker plies of fabric of parallel metallic cords such as steel cords, in which the cords of the radially innermost first ply and the cords of the third ply are inclined at a relatively small angle to the equatorial plane of the tire, wherein the cords of the second ply, disposed radially between the first and third plies, are the only cords inclined at an inclination angle with respect to the equatorial plane in the range of 40°–85°, and wherein the cords of the first and third plies are inclined in opposite directions to each other and have inclination angles with respect to the equatorial plane in the range of 5°–40°.

Preferably, the inclination angle of the cords of the second ply is in the range of 65° to 75° and the inclination angles of the cords of the first and third plies are in the range of 15° to 25° Most preferably, the cords of the second ply, are at 67° and those of the first and third plies are at 18°.

While the first, second and third plies may have different widths in any configuration, most preferably, the innermost first ply is the widest and the adjacent second ply is the narrowest. In the case that the second ply is narrowest or narrower than the third ply then, preferably, there is provided, immediately adjacent to each edge of the second ply, a rubber strip extending axially outwardly at least as far as the edge of the third ply and having a thickness such that the lateral region of the third ply is supported.

BRIEF DESCRIPTION OF THE DRAWINGS

Further aspects to the invention will become apparent on reading the following description given by way of example only of an embodiment of the invention taken in conjunction with the following Figures in which:

FIGS. 2–5 are schematic diagrams showing the possible relative breaker cord directions according to the present invention;

FIGS. 6–11 are schematic diagrams showing alternative arrangements of breaker strip widths according to the present invention; and FIG. 12 shows a variant embodiment of the second ply.

DETAILED DESCRIPTION OF THE INVENTION

Figure 1:
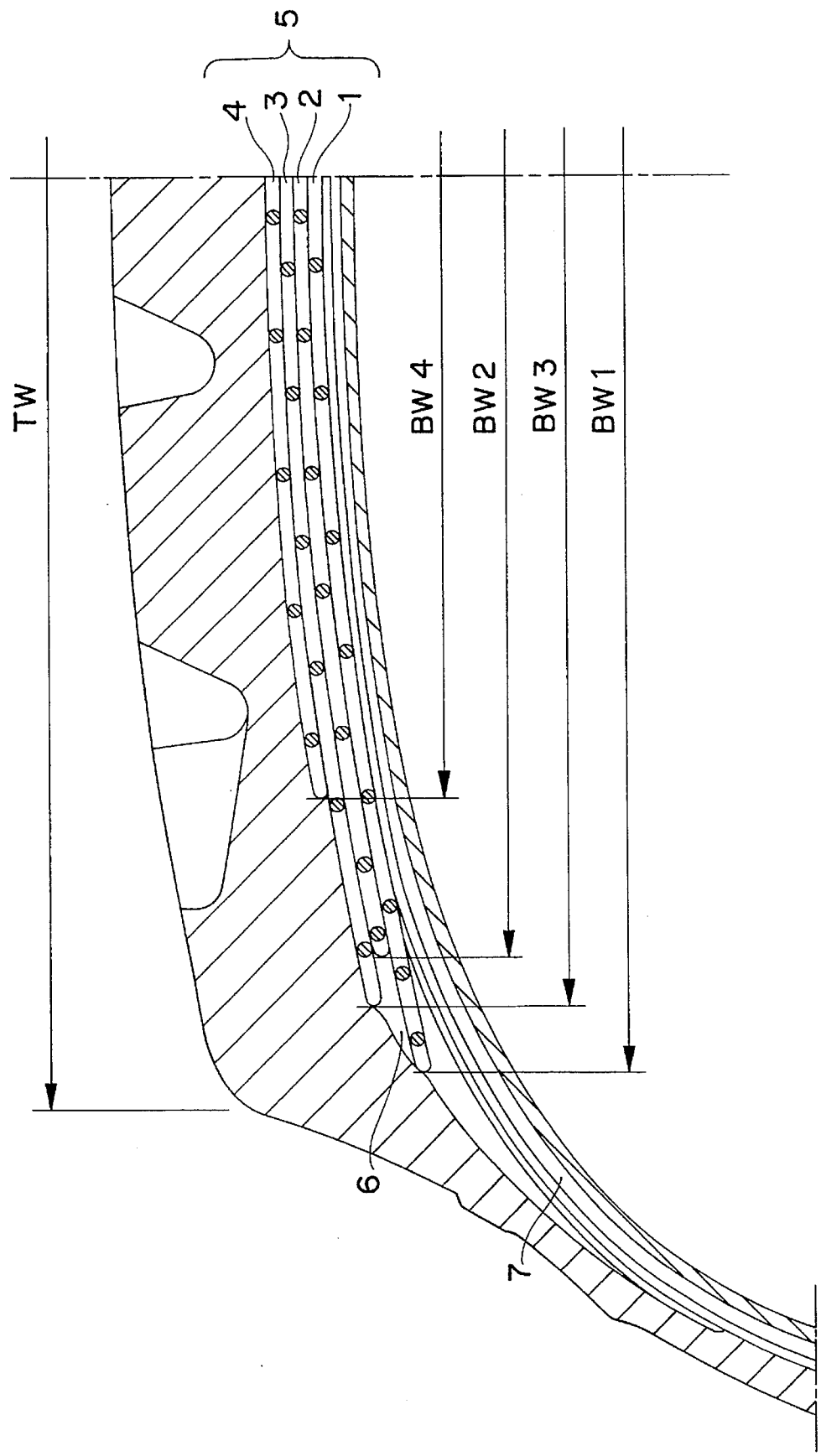
FIG. 1 is a schematic diagram showing the cross section of a truck tire tread region according to the present invention.

FIG. 1 shows a half cross-section of the tread region of a 385/65R22.5 truck tire in accordance with the present invention. The tire has an overall tread width TW of 290 mm. The tread region is reinforced by a breaker strip assembly 5 comprising in the radially inward towards outward direction four plies 1–4 of steel cord fabric. This breaker strip assembly 5 is disposed radially extending outside a carcass ply reinforced by radially extending reinforcing steel cords 7. The overall widths BW1-BW4 in the axial direction of the tire of the four breaker strips are, respectively, 280, 245, 260 and 195 mm. Accordingly, the breaker strips are arranged according to width such that BW1>BW3>BW2>BW4. This arrangement of the main breaker strips 1–3 is shown schematically in FIG. 6.

All four breaker strips 1–4 are steel cord fabric of cut steel cords laid parallel to each other and embedded in rubber. The cords of the main plies 1–3 are inclined with respect to the circumferential equator CE of the tire at angles of $\alpha 1$, $\alpha 2$ and $\alpha 3$ respectively. These angles have values of 18°, 67° and 18° respectively. Breaker plies 1 and 2 have their cords inclined in the same direction with respect to the circumferential equator CE whereas the cords of breaker ply 3 are oppositely inclined to the circumferential equator CE. This arrangement of the inclinations $\alpha 1$, $\alpha 2$ and $\alpha 3$ of the three main breaker plies 1–3 in relation to the tire circumferential equator CE and the radially disposed carcass ply cords 7 is shown in FIG. 2. The cords of the fourth ply 4 are inclined also at 18° in the same direction as the third ply 3.

The truck tire shown in FIG. 1 additionally has in the breaker strip assembly a rubber strip 6 positioned on the radial outside of the first ply 1 adjacent to the axial outer edge of the second ply 2. This rubber strip 6, thus, provides support for the axial outer portion of the third ply 3 which is radially adjacent to the second ply 2.

The truck tire breaker strip assembly 5 shown in FIG. 1 and described above has been tested and shown to exhibit improved resistance to belt ply looseness.

While the present invention has been illustrated by the tire shown in FIG. 1 and as described above, other arrangements of the breaker strip assembly 5 are possible within the scope of the invention, provided that the first and third plies 1 and 3 have opposite inclination angles in the range of 5° to 40° and the second ply 2 has an inclination the range of 40°–85°.

Alternative arrangements of ply cords directions and breaker ply widths are shown in FIGS. 3–5 and FIGS. 6–11, respectively. These arrangements also provide improved edging rubber looseness characteristics for the heavy duty tire.

FIGS. 6 to 11 show alternative arrangements for breaker ply widths. In FIG. 6, the second ply is the narrowest and the first ply is the widest. In FIG. 7, the first ply is the narrowest and the third ply is the widest. In FIG. 8, the first ply is the widest and the third ply is the narrowest. In FIG. 9, the second ply is the widest and the third ply is the narrowest. In FIG. 10, the second ply is the widest and the first ply is the narrowest. In FIG. 11, the second ply is the narrowest and the third ply is the widest.

FIGS. 1 to 11 show a tire in which the second ply is made in one piece.

FIG. 12 shows an arrangement of breaker plies 1, 2, 3, which is similar to the arrangement of FIG. 6 in which the second ply is constituted of 2 parts 2a and 2b disposed on either side of the circumferential equator CE and separated by a rubber strip 9. The cords of the two parts 2a and 2b are parallel with each other. This arrangement of the second ply 2 may be applied to the various arrangements shown in FIGS. 6 to 11.

Having now described my invention what I claim is:

1. A heavy duty radial tire comprising a ground contacting tread region reinforced by a belt comprising at least four breaker plies of strips of fabric comprising parallel metallic cords in which the cords of the radially innermost first ply and those of the third ply are inclined at a relatively small angle with respect to the equatorial plane of the tire, wherein the cords of the second ply, disposed radially between the first and third plies, are the only cords inclined at an inclination angle with respect to the equatorial plane in the range of 40° to 85°, and wherein the cords of the first and third plies are inclined in opposite directions to each other and have inclination angles with respect to the equatorial plane in the range of 5° to 40°.

2. The heavy duty radial tire according to claim 1, wherein the inclination angle with respect to the equatorial plane of the cords of the second ply is in the range of 65° to 75° and the inclination angles with respect to the equatorial plane of the cords of the first and third plies are in the range of 15° to 25°.

3. The heavy duty radial tire according to claim 1, wherein the inclination angle with respect to the equatorial plane of the cords to the second ply is 67° and the inclination angles with respect to the equatorial plane of the cords of the first and third plies are 18°.

4. The heavy duty radial tire according to claim 1, wherein the cords of the second and third plies are inclined in the same direction.

5. The heavy duty radial tire according to claim 1, wherein the cords of the first and second plies are inclined in the same direction.

6. The heavy duty radial tire according to claim 1, wherein the second ply is made of two parts.

7. The heavy duty radial tire according to claim 1, wherein the second ply is narrower than the third ply and wherein immediately adjacent to each axially outer edge of the second ply is provided a rubber strip extending axially outwardly at least as far as the edge of the radially outer wider third ply and having sufficient thickness in the radial direction to support the axially outer lateral region of the third ply.

8. The heavy duty radial tire according to claim 1, wherein the first ply is the narrowest and the third ply is the widest.

9. The heavy duty radial tire according to claim 1, wherein the first ply is the widest and the third ply is the narrowest.

10. The heavy duty radial tire according to claim 1, wherein the second ply is the widest and the third ply is the narrowest.

11. The heavy duty radial tire according to claim 1, wherein the second ply is the widest and the first ply is the narrowest.

12. The heavy duty radial tire according to claim 1, wherein the second ply is the narrowest and the first ply is the widest.

13. The heavy duty radial tire according to claim 1, wherein the second ply is the narrowest and the third ply is the widest.

14. The heavy duty radial tire according to claim 1, wherein the second ply has an axial width of 84% of the tread width.

* * * * *